(12) United States Patent
Dal Pont

(10) Patent No.: US 11,662,605 B2
(45) Date of Patent: May 30, 2023

(54) FLEXIBLE TEMPLE FOR EYEGLASSES

(71) Applicant: LUXOTTICA S.R.L., Agordo (IT)

(72) Inventor: Moreno Dal Pont, Sedico (IT)

(73) Assignee: LUXOTTICA S.R.L., Agordo (IT)

( * ) Notice: Subject to any disclaimer, the term of this patent is extended or adjusted under 35 U.S.C. 154(b) by 217 days.

(21) Appl. No.: 17/255,890

(22) PCT Filed: Jun. 12, 2019

(86) PCT No.: PCT/EP2019/065363
§ 371 (c)(1),
(2) Date: Dec. 23, 2020

(87) PCT Pub. No.: WO2020/001980
PCT Pub. Date: Jan. 2, 2020

(65) Prior Publication Data
US 2021/0263335 A1 Aug. 26, 2021

(30) Foreign Application Priority Data

Jun. 28, 2018 (IT) .................. 102018000006736

(51) Int. Cl.
*G02C 5/16* (2006.01)
*G02C 5/22* (2006.01)
*G02C 5/14* (2006.01)

(52) U.S. Cl.
CPC ............... *G02C 5/16* (2013.01); *G02C 5/146* (2013.01); *G02C 5/22* (2013.01); *G02C 5/2227* (2013.01); *G02C 5/2245* (2013.01); *G02C 5/2254* (2013.01); *G02C 2200/26* (2013.01)

(58) Field of Classification Search
None
See application file for complete search history.

(56) References Cited

U.S. PATENT DOCUMENTS

2016/0116761 A1 4/2016 Sbardella
2019/0162983 A1* 5/2019 Montalban .......... G02C 5/2245

FOREIGN PATENT DOCUMENTS

| DE | 1983801 U | 4/1968 |
|---|---|---|
| EP | 1580590 A1 | 9/2005 |
| FR | 2614953 A1 | 11/1988 |
| WO | 2005008317 A1 | 1/2005 |
| WO | 2005111701 A1 | 11/2005 |
| WO | 2008006778 A1 | 1/2008 |
| WO | 2016023053 A1 | 2/2016 |

OTHER PUBLICATIONS

International Search Report dated Aug. 29, 2019 re: Application No. PCT/EP2019/065363, pp. 1-4, citing: WO 2008/006778 A1, DE 19 83 801 U, FR 2 614 953 A1 and WO 2005/111701 A1.
IT Search Report dated Mar. 13, 2019 re: Application No. IT 201800006736, pp. 1-6, citing: WO 2008/006778 A1, DE 19 83 801 U, FR 2 614 953 A1 and WO 2005/111701 A1.
Written Opinion dated Aug. 29, 2019 re: Application No. PCT/EP2019/065363, pp. 1-6, citing: WO 2008/006778 A1, DE 19 83 801 U, FR 2 614 953A1 and WO 2005/111701 A1.

* cited by examiner

*Primary Examiner* — Darryl J Collins
(74) *Attorney, Agent, or Firm* — Cantor Colburn LLP

(57) ABSTRACT

A flexible temple for eyeglasses has a temple body which has a fork-shaped end adapted to form a slot within which a slider can slide in contrast with the action of an elastic component. The elastic component is accommodated in a preloaded condition in the slider.

6 Claims, 4 Drawing Sheets

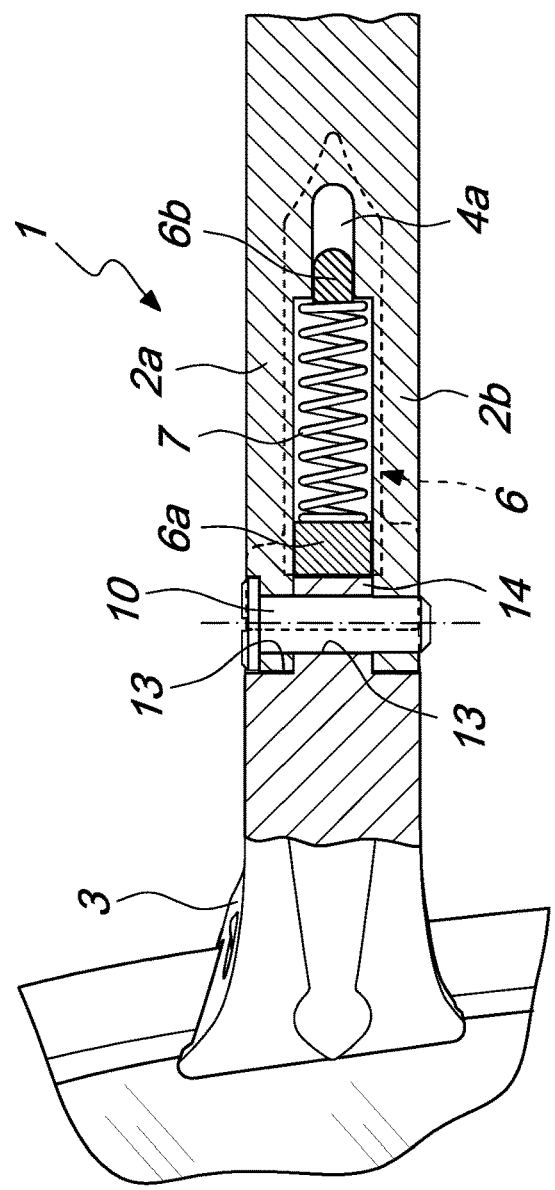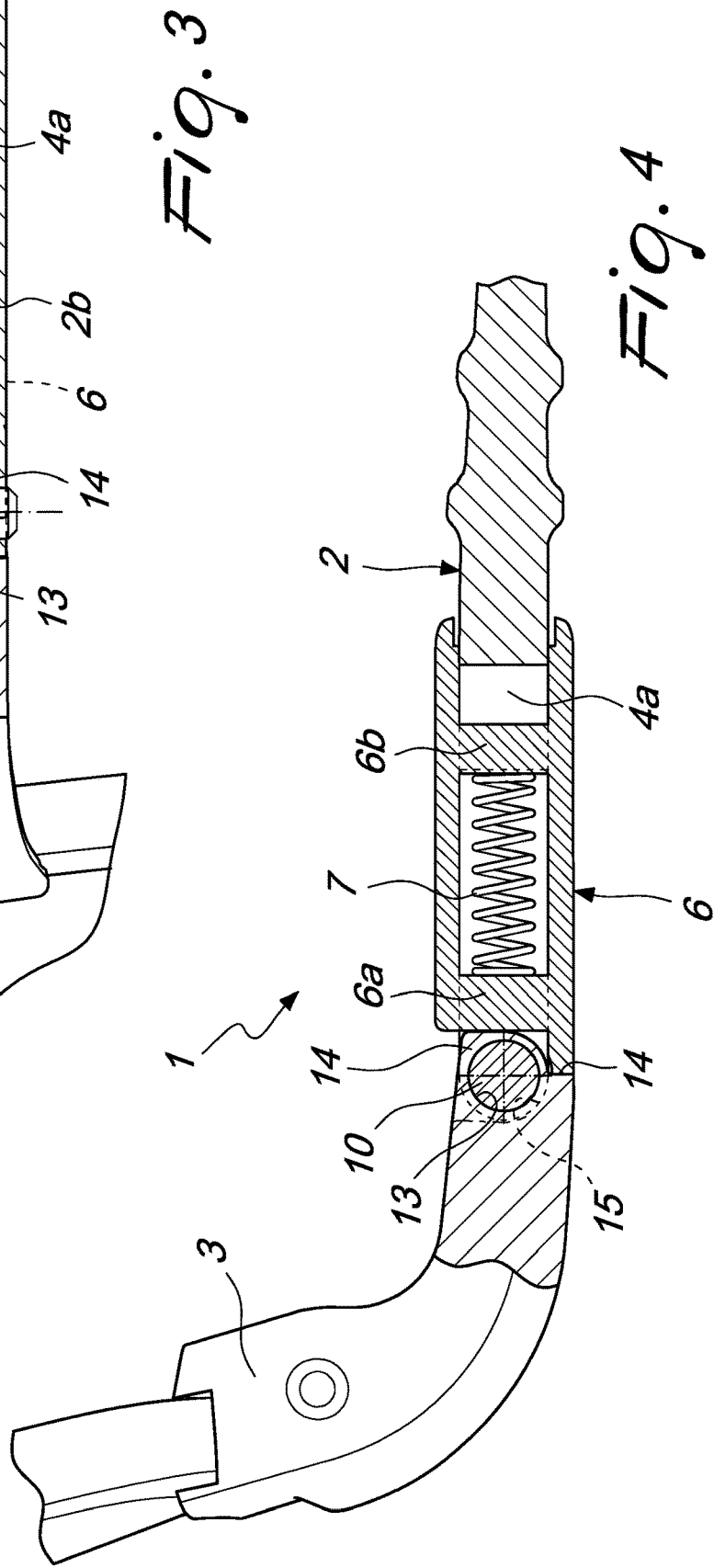

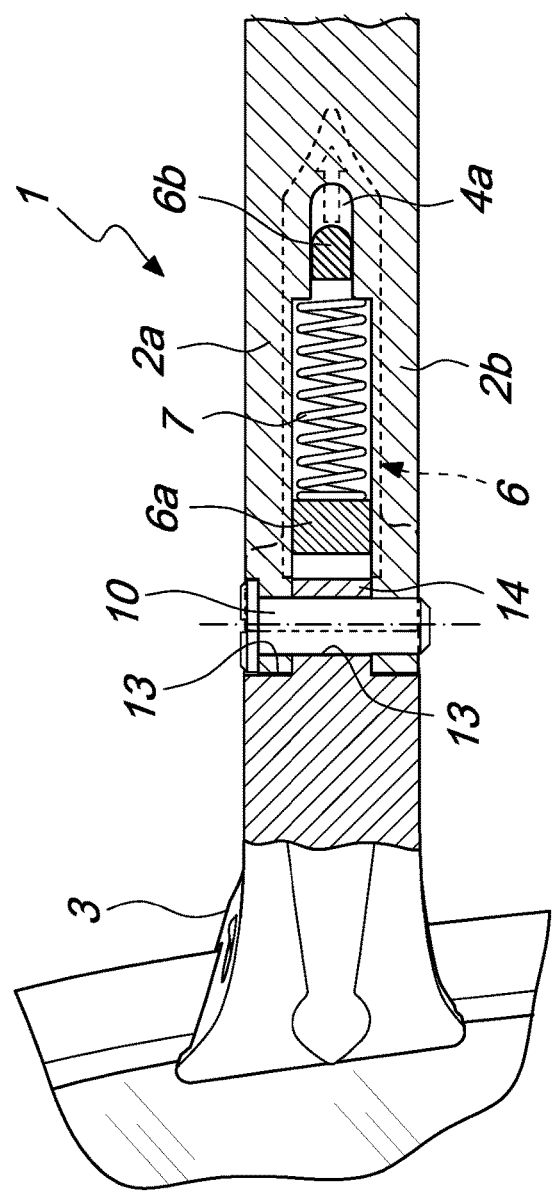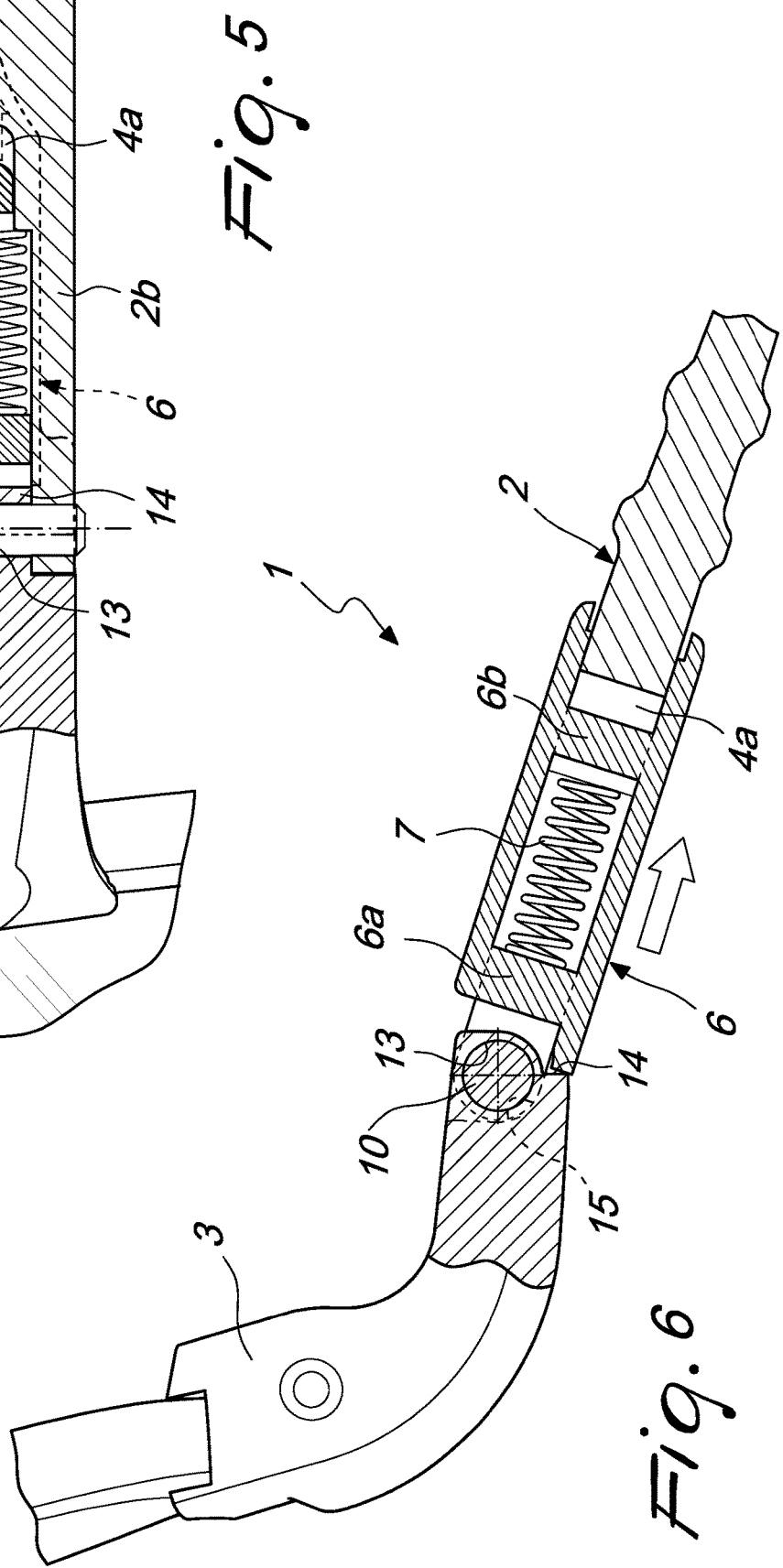

FLEXIBLE TEMPLE FOR EYEGLASSES

TECHNICAL FIELD

The present disclosure relates to a flexible temple for eyeglasses. More particularly, the disclosure relates to a flexible temple for eyeglasses that is hinged to an element of the front of the frame of the eyeglasses in an elastic manner.

BACKGROUND

As is known, frames are commercially available which have temples that are coupled in an elastic manner to the element of the front of said frame. In other words, the temple is mated with the element of the front of the frame and can be divaricated beyond its normal position of use, without breaking the temple, without breaking the connection hinge between the temple and the element of the front, and without said hinge being damaged.

Eyeglasses with this type of hinges are usually called eyeglasses with flex temples or flex hinges. The flexibility or elasticity of the temple with respect to the element of the front of the frame allows to wear the eyeglasses more comfortably and also allows to handle them with less care, since the temple is certainly less delicate than temples that have hinges of a conventional type, therefore not flex hinges.

Flex temples of the known type usually provide for a mating between the temple and an element of the front of the frame by means of a slider that is elastically coupled within a slot defined in the temple.

In this manner, the movement of the temple to open beyond its normal position, known as overtravel, is provided by virtue of a rotation cam of the element of the front that entrains the slider outward, by virtue of the compression of the spring that is coupled to the temple by means of a retention element.

The solution described above, although functional as regards the elasticity given to the temple, has the drawback that the spring must be inserted with appropriate tools, must then be preloaded and then locked in a last step. This entails difficulty in assembly that leads to longer times and higher costs.

Moreover, the parts that constitute traditional flex systems, so-called slider systems, require high-precision machining, particularly for the provision of the pocket inside which the retention element is inserted.

SUMMARY

The aim of the present disclosure is to provide a flexible temple for eyeglasses that can be coupled in an elastic manner to an element of the front of the frame and does not require special tools for the preloading and insertion of the spring.

Within this aim, the present disclosure provides a flexible temple for eyeglasses in which the spring can be inserted already in preloaded condition, saving time and costs.

The present disclosure also provides a flexible temple for eyeglasses that has a reduced number of components and less delicate machining operations.

The present disclosure further provides a flexible temple for eyeglasses that has the possibility to adjust the opening angle in overtravel (or over-flex).

The present disclosure advantageously provides a flexible temple for eyeglasses that is highly reliable, relatively easy to provide and at competitive costs.

This aim and these and other advantages that will become better apparent hereinafter are achieved by providing a flexible temple for eyeglasses, wherein the temple comprises a temple body which has a fork-shaped end adapted to form a slot within which a slider can move slidingly in contrast with the action of elastic means, said elastic means being accommodated in a preloaded condition in said slider.

BRIEF DESCRIPTION OF THE DRAWINGS

Further characteristics and advantages of the disclosure will become better apparent from the description of a preferred but not exclusive embodiment of the temple according to the disclosure, illustrated by way of non-limiting example in the accompanying drawings, wherein:

FIG. 3 is a longitudinal sectional view of the temple according to the disclosure in an inactive configuration;

FIG. 4 is a transverse sectional view of the temple according to the disclosure in an inactive configuration;

FIG. 5 is a longitudinal sectional view of the temple according to the disclosure in an inactive configuration; and FIG. 6 is a transverse sectional view of the temple according to the disclosure in the overtravel (or over-flex) (flexing) condition with respect to the front element of the frame.

DETAILED DESCRIPTION OF THE DRAWINGS

Figure 1:
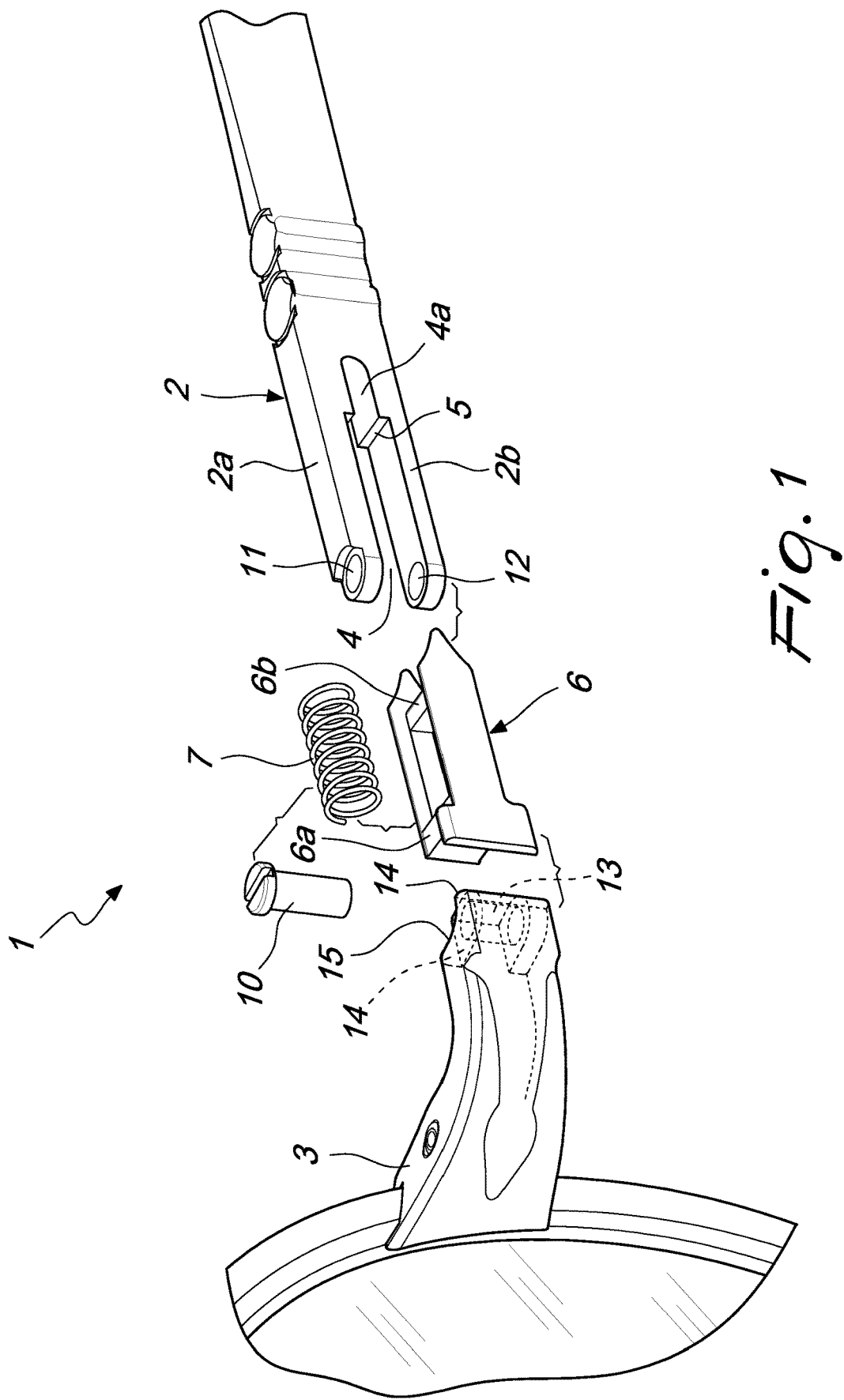
FIG. 1 is an exploded perspective view of the temple according to the disclosure, mated to an element of the front of the frame.
Figure 2:
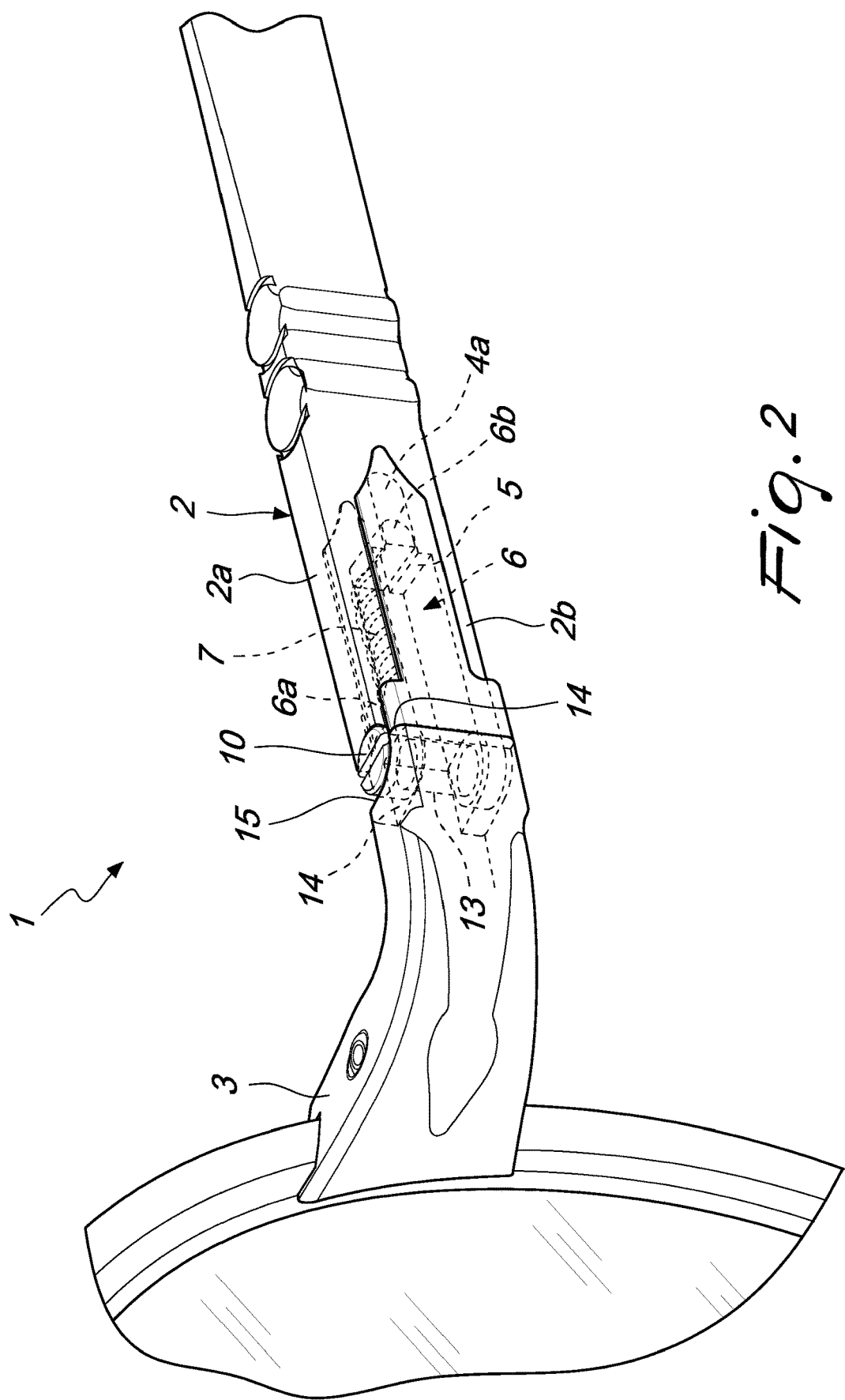
FIG. 2 is a perspective view of the temple according to the disclosure, mated to an element of the front of the frame.

The flexible, i.e., elastic, temple for eyeglasses according to the disclosure, generally designated by the reference numeral 1, comprises a temple body having a fork-shaped end 2, adapted to be mated to an element of the front 3 of the frame of the eyeglasses.

The end 2 therefore comprises an upper elongated portion 2a and a lower elongated portion 2b that form between them a slot 4, which is shaped with an initial portion that is wider than a terminal portion 4a. The separation between the initial portion and the terminal portion is provided by a shoulder 5.

The slot 4 accommodates a slider 6, which in turn accommodates elastic means 7 inside it. The elastic means 7, constituted for example by a spring 7, are accommodated between a shoulder 6a of the slider and a containment portion 6b of the spring. The spring 7 is inserted between the shoulder 6a and the containment portion 6b in a preloaded condition.

Essentially, therefore, the spring 7 is accommodated within the slider by lateral insertion, without the aid of particular tools, and is accommodated in an already preloaded condition within the slider 6 itself.

The mating between the end 2 of the temple and the element of the front 3 occurs by virtue of an engagement means 10, for example a pin or a screw or the like, which mates in two opposite holes 11 and 12, which are defined in the portions 2a and 2b of the temple 2, respectively, and in a hole 13 defined in a portion 14 of the element of the front 3 that is inserted in the fork defined at the end of the temple body 2, so that the holes 11, 13 and 12 are, in this sequence, aligned so that the engagement means 10 can be inserted in them and can thus lock the temple 2 mated to the element of the front 3, with a rotatable coupling.

The upper portion and the lower portion of the end of the temple 2 can have a recessed configuration at the holes 11 and 12, in order to accommodate the head of the pin 10 flush with the outer surface of the temple and make the temple more aesthetically pleasant.

The ends of the portions 2a and 2b are conveniently rounded so as to be accommodated in contact with a portion 15, also rounded in a complementary manner, of the element of the front 3.

The portion 6b of the slider 6 acts as a stroke limiting abutment element, accommodating in the portion 4a of the slot 4 when the slider 6 is pushed, compressing the elastic means 7 toward the terminal end of the temple 2.

The compression of the spring 7 when said slider 6 is accommodated within the slot 4 of the temple 2 and is pushed toward the bottom of said slot occurs since the spring 7 abuts against the shoulders 5 of the slot 4, which allow the compression of the spring and therefore allow the slider to be elastically opposed in its movement toward the bottom of the slot 4. This allows to have an overtravel of the temple 2 when the latter is mated to the element of the front 3.

In greater detail, when the user acts on the temple 2, moving it elastically in overtravel with respect to its normal operating condition, the element of the front 3 makes abutment contact with the slider 6, which protrudes from the outer face of the temple body 2, pushing against the slider 6, which moves within the slot. The spring 7 is compressed, since it abuts against the shoulder 5 while the slider 6 slides toward the bottom of the portion 4a of the slot 4. In this manner the temple 2 flexes elastically outward.

When the spring 7 abuts against the shoulder 5, the spring 7 is spaced from the portion 6b of the slider 6.

The stroke limit of the temple 2 in the overtravel movement is provided upon reaching the bottom of the portion 4a of the slot by the portion 6b of the slider 6.

This is the maximum stroke that the slider 6 can perform within the slot 4 and is therefore the maximum overtravel stroke that the temple 2 can have with respect to the element of the front 3.

The overtravel can be adjusted and determined on the basis of the depth of the portion 4a of the slot 4 and/or on the basis of the position of the portion 6b.

In practice it has been found that the temple according to the disclosure fully achieves the intended aim and objects, because it allows to be subjected to over-flexing with respect to the frame, with the spring that can be accommodated within the slider for lateral insertion, without the aid of particular tools, and is accommodated within the slider itself in an already preloaded condition.

This allows easy assembly and subsequent disassembly, if any, of the slider and of the corresponding spring.

The temple thus conceived is susceptible of numerous modifications and variations within the scope of the appended claims.

All the details may furthermore be replaced with other technically equivalent elements.

In practice, the materials used, as well as the contingent shapes and dimensions, may be any according to the requirements and the state of the art.

The disclosures in Italian Patent Application No. 102018000006736 from which this application claims priority are incorporated herein by reference.

The invention claimed is:

1. A flexible temple for eyeglasses, comprising a temple body having a fork-shaped end configured to form a slot within which a slider is configured to slide in contrast with an action of elastic means, said elastic means being accommodated in a preloaded condition in said slider, wherein said slider comprises a first shoulder portion and a portion configured for containment of said elastic means, which are adapted to define a receptacle for accommodating said elastic means in the preloaded condition, and wherein said slider is configured to move in a first portion of said slot which is wider than a terminal portion of said slot, said first shoulder portion for containing the elastic means being adapted to engage said terminal portion of said slot.

2. The temple according to claim 1, wherein said fork-shaped end comprises a first upper portion and a second lower portion, said first upper and second lower portions are configured to define said fork and to accommodate said slider, said first upper and second lower portions being each provided with a hole for engagement of an engagement means adapted to mate said temple with an element of the front of a frame.

3. The temple according to claim 2, wherein said element of the front has a rounded contoured portion adapted to engage by abutment rounded ends of said upper portion and said lower portion of said fork-shaped end of the temple.

4. The temple according to claim 2, wherein said element of the front comprises a portion adapted to be accommodated between said upper portion and said lower portion of said fork-shaped end of the temple, said portion of the front being provided with a hole adapted to be engaged by said engagement means, together with said holes formed in said upper portion and said lower portion of the temple.

5. The temple according to claim 1, wherein said slider is configured to be extracted from said temple while said elastic means are kept accommodated within said slider.

6. Eyeglasses comprising a pair of temples according to claim 1.

* * * * *